US008776649B2

(12) United States Patent
Sjöö

(10) Patent No.: US 8,776,649 B2
(45) Date of Patent: Jul. 15, 2014

(54) TURNING INSERT, A TOOL PART, A METHOD AS WELL AS A MACHINE TOOL FOR CHIP-CUTTING METAL MACHINING

(75) Inventor: Sture Sjöö, Gävle (SE)

(73) Assignee: Sandvik Intellectual Property AB, Sandviken (SE)

( * ) Notice: Subject to any disclaimer, the term of this patent is extended or adjusted under 35 U.S.C. 154(b) by 551 days.

(21) Appl. No.: 13/025,915

(22) Filed: Feb. 11, 2011

(65) Prior Publication Data
US 2011/0197723 A1   Aug. 18, 2011

(30) Foreign Application Priority Data
Feb. 12, 2010   (SE) .................................... 1050140-1

(51) Int. Cl.
*B23B 27/16*   (2006.01)
*B23B 27/12*   (2006.01)

(52) U.S. Cl.
USPC .............. 82/1.11; 407/42; 407/113; 407/114; 82/131

(58) Field of Classification Search
USPC ........... 407/7, 11, 29.13, 29.15, 64, 104, 113, 407/114, 13, 16, 19, 42, 48, 54, 57; 82/131, 82/1.11
See application file for complete search history.

(56) References Cited

U.S. PATENT DOCUMENTS

| | | | | |
|---|---|---|---|---|
| 1,838,520 A | * | 12/1931 | Archer | 407/104 |
| 4,812,087 A | * | 3/1989 | Stashko | 407/42 |
| 5,779,401 A | | 7/1998 | Stallwitz et al. | |
| 6,053,671 A | * | 4/2000 | Stedt et al. | 407/35 |
| 6,152,658 A | * | 11/2000 | Satran et al. | 407/103 |
| 6,164,878 A | * | 12/2000 | Satran et al. | 407/113 |
| 7,156,006 B2 | | 1/2007 | Hyatt et al. | |
| 7,325,471 B2 | | 2/2008 | Massa et al. | |
| 7,381,015 B2 | * | 6/2008 | Jonsson | 407/116 |
| 8,277,151 B2 | * | 10/2012 | Wandeback | 407/42 |
| 2007/0041798 A1 | * | 2/2007 | Nasu et al. | 407/114 |
| 2008/0232909 A1 | | 9/2008 | Filho et al. | |

FOREIGN PATENT DOCUMENTS

| | | |
|---|---|---|
| CN | 1187785 | 7/1998 |
| CN | 1859992 | 11/2006 |
| EP | 1 749 602 A2 | 2/2007 |

OTHER PUBLICATIONS

Notification of First Office Action (with English Translation) in Chinese Application No. 201110039511.0, dated Mar. 5, 2014.

* cited by examiner

*Primary Examiner* — Andrea Wellington
*Assistant Examiner* — Brendan Ayer
(74) *Attorney, Agent, or Firm* — Morgan, Lewis & Bockius LLP

(57) ABSTRACT

A turning insert formed for chip-cutting metal machining of a workpiece that rotates in a direction of rotation at a first speed of rotation around a workpiece axis, the turning insert including a front surface, an envelope surface, and a circular cutting edge located where the front surface meets the envelope surface. The cutting edge extends around the front surface and lays in a plane that forms an angle α with the envelope surface. A tool axis extends through the turning insert in a normal direction in respect of the plane, and the turning insert, during the chip-cutting metal machining, is formed to rotate around the tool axis at a second speed of rotation. The envelope surface forms a chip surface and is arranged to meet chips formed in the chip-cutting metal machining, and the chip surface includes chip breaking means.

15 Claims, 8 Drawing Sheets

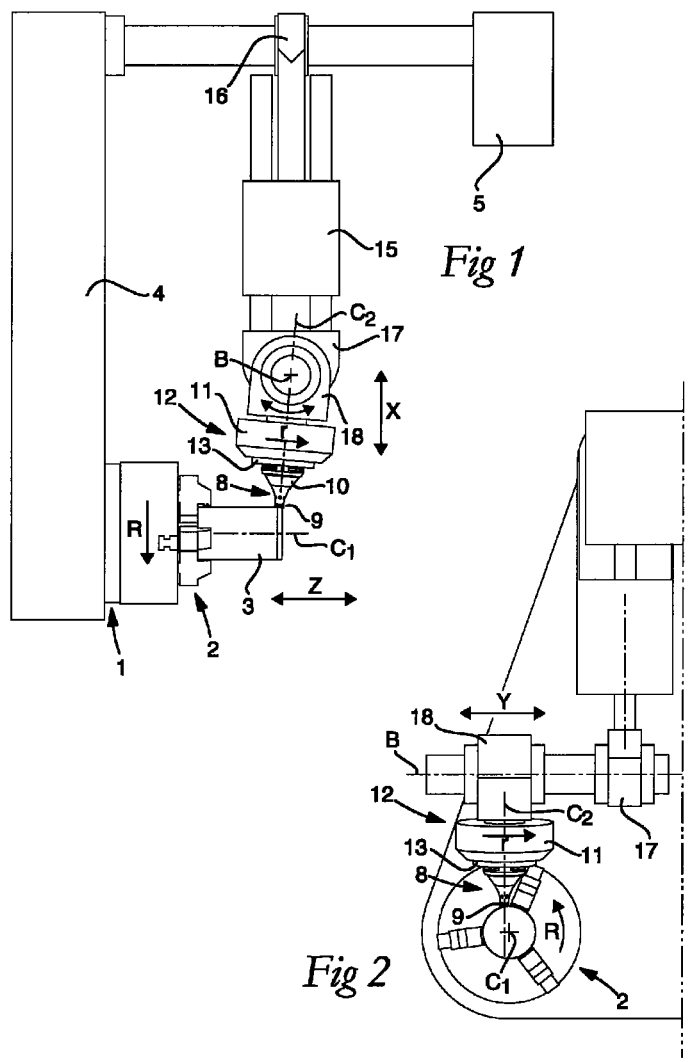

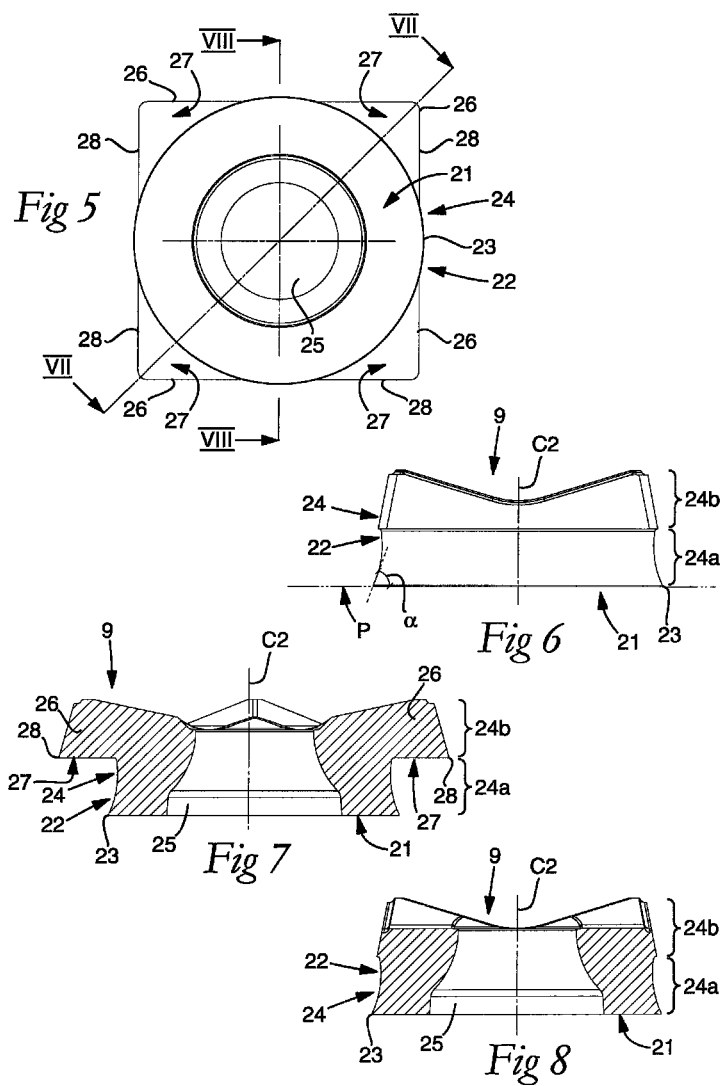

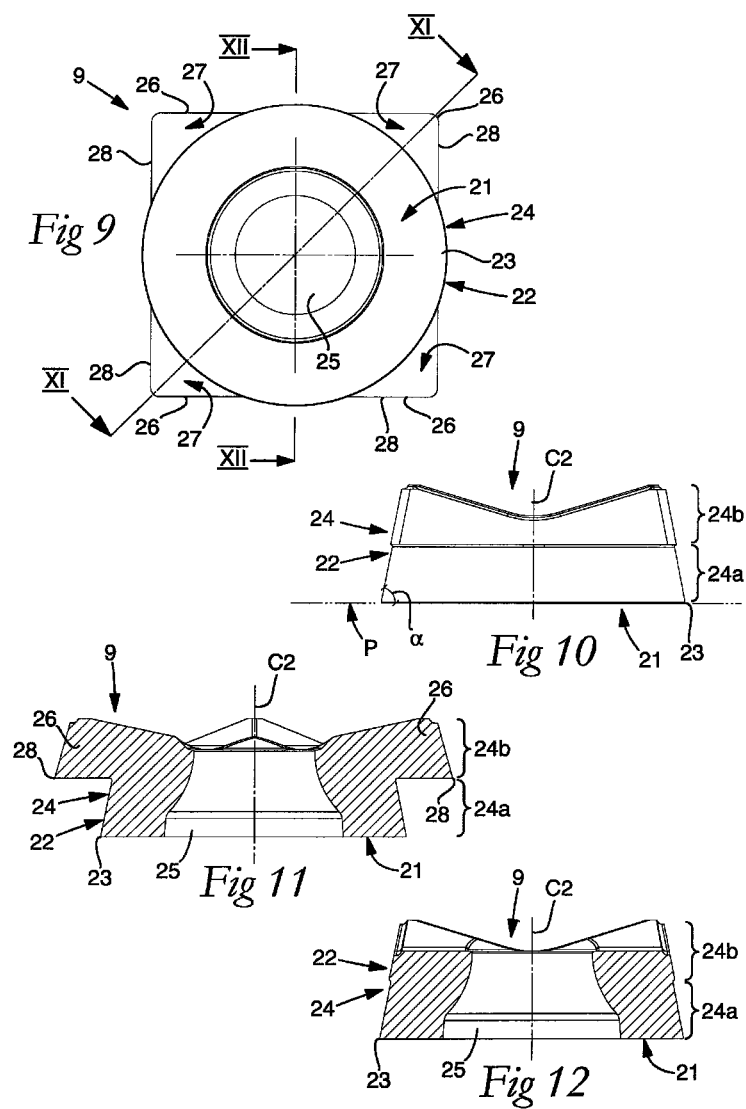

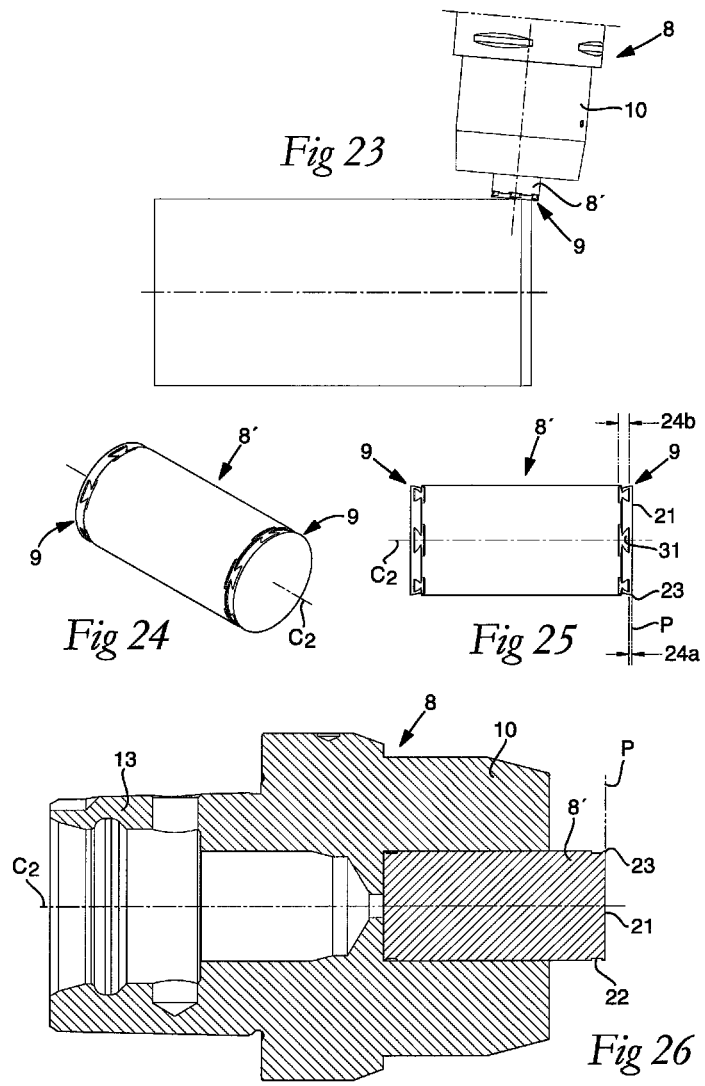

TURNING INSERT, A TOOL PART, A METHOD AS WELL AS A MACHINE TOOL FOR CHIP-CUTTING METAL MACHINING

This application claims priority under 35 U.S.C. §119 to Swedish Patent Application No. 1050140-1, filed on Feb. 12, 2010, which is incorporated by reference herein in its entirety.

FIELD OF THE INVENTION

The present invention relates generally to chip-cutting metal machining by turning. More precisely, the invention relates to a turning insert formed for chip-cutting metal machining of a workpiece that rotates in a first direction of rotation at a first speed of rotation around a workpiece axis. The turning insert includes a front surface, an envelope surface and a circular cutting edge located where the front surface meets the envelope surface, the cutting edge extending around the front surface and lying in a plane that forms an angle $\alpha$ with the envelope surface. A tool axis extends through the turning insert in a normal direction in respect of the plane, and the turning insert, during the chip-cutting metal machining, is formed to rotate around the tool axis at a second speed of rotation. The invention also relates to a tool part for chip-cutting metal machining, a method for chip-cutting metal machining, as well as a machine tool for chip-cutting metal machining.

BACKGROUND OF THE INVENTION

U.S. Pat. No. 7,156,006 discloses a turning insert for a machine tool that is holding a rotating workpiece, the turning insert being brought into cutting engagement with the workpiece and simultaneously rotating around its own axis. The rotating turning insert is held in a rotary tool holder. The front surface of the rotating turning insert is formed as a chip surface and may include means for breaking the chips formed in the machining.

U.S. Pat. No. 7,325,471 discloses a turning insert similar to the one disclosed in U.S. Pat. No. 7,156,006 and intended to be used in a similar machine tool.

In conventional turning machining, where the turning insert is stationary, i.e., does not rotate around its own axis, the same area of the turning insert will be in engagement with the workpiece during the entire turning operation. This means that the heating of this area becomes high and that the wear of the same area thereby becomes great. This in turn affects the service life negatively.

By allowing the turning insert to rotate around its own axis, the part of the cutting edge that is in engagement with the workpiece will be displaced continuously so that new cutting edge is fed forward all the time. In such a way, the part of the cutting edge that is in engagement with the workpiece is given the possibility of cooling down, whereby the temperature at the cutting edge can be kept on a lower level than in conventional turning. This means that the service life of the tool can increase. Alternatively, the intensity of the machining can be increased at a maintained high temperature. A longer service life has great advantages since the turning operation can be carried out with no or fewer replacements of turning inserts. In addition to the higher efficiency and the economic benefits achieved thereby, this is advantageous since it is difficult to avoid irregularities in the machined surface after a replacement of a turning insert.

The technique disclosed in the above-mentioned U.S. Pat. No. 7,156,006 has the disadvantage that the tool, which rotates around its own center axis, has to be relatively long and slender, particularly in those cases when the workpiece has a large diameter. This is a consequence of the fact that the rotation axis of the tool extends essentially tangentially with the workpiece and that the shape and dimensions of the tool have to be such that no parts of the tool, except the turning insert, can contact the workpiece during the machining. For this reason, it is also difficult to face turn end surfaces of workpieces using the technique disclosed in U.S. Pat. No. 7,156,006 and U.S. Pat. No. 7,325,471, particularly if the radius of the end surface is longer than the front slender part of the tool.

An object of the invention to achieve a chip-cutting metal working wherein the turning insert can achieve a long service life and thereby a long machining time. The chip-cutting metal machining should also be flexible and be applicable for the machining of different types of workpieces, particularly workpieces of a large diameter. Furthermore, the chip-cutting metal machining should be realizable by a relatively simple machine tool and in a relatively simple method.

SUMMARY OF THE INVENTION

In an embodiment, the invention provides a turning insert formed for chip-cutting metal machining of a workpiece that rotates in a direction of rotation at a first speed of rotation around a workpiece axis, the turning insert including a front surface, an envelope surface, and a circular cutting edge located where the front surface meets the envelope surface. The cutting edge extends around the front surface and lays in a plane that forms an angle $\alpha$, with the envelope surface. A tool axis extends through the turning insert in a normal direction in respect of the plane, and the turning insert, during the chip-cutting metal machining, is formed to rotate around the tool axis at a second speed of rotation. The envelope surface forms a chip surface and is arranged to meet chips formed in the chip-cutting metal machining, and the chip surface includes chip breaking means.

By such a turning insert, which rotates around its own tool axis, an advantage is achieved that a new active cutting edge is fed continuously up to engagement with the workpiece. Accordingly, each part of the active cutting edge will only be in engagement with the workpiece during a relatively short time of the machining. During the time when the cutting edge is not in engagement with the workpiece, it can cool down, whereby the temperature of the cutting edge can be kept on a relatively low level. The fact that the envelope surface of the turning insert forms the chip surface entails that the tool can be made relatively short since the tool extends away from the workpiece. The risk of parts of the tool contacting the workpiece during the machining is therefore obviated. This is particularly advantageous in order to allow machining of workpieces of a large diameter and to allow face turning. The machining is also facilitated by the tool being relatively short along its tool axis, which means that problems of vibrations and unbalances can be kept on a low level.

The chip surface may include a circumferential first portion that borders on the cutting edge and a circumferential second portion that borders on the first portion. The chip breaking means may include the second portion. Accordingly, the chip breaking means may be situated at a certain distance from the proper cutting edge.

The first portion may have a rotationally symmetrical first extension.

The angle $\alpha$ may be smaller than or equal to 90° in respect of the first portion. Accordingly, the first portion may be conical. However, it should be noted that the first portion may also be cylindrical, i.e., the angle $\alpha$ is equal to 90°.

The first portion may have a concave shape as seen in a cross-sectional plane including the tool axis. The concave shape may extend across the entire first portion, i.e., the first portion may be concave. It is also possible to allow the concave shape to form at least part of the chip breaking means. In this case, the concave shape of the first portion may have a relatively small radius of curvature so that the chips that impinge on the first portion are bent so abruptly that they also are broken.

The second portion may have a non-rotationally symmetrical second extension that forms at least part of the chip breaking means. Such a non-rotationally symmetrical extension will act as an efficient chip breaker in the chip-cutting metal machining, since the chip surface is displaced continuously in relation to the chip formed. Accordingly, the chip will meet a chip surface that alternately extends upward and downward.

The chip breaking means may include at least one of an elevation that extends outward in respect of the tool axis and a recess that extends inward in respect of the tool axis. Accordingly, the chip breaking means may include elevations that project from the envelope surface and that are distributed along the circumference of the envelope surface. The chip breaking means may also include depressions in the envelope surface that are distributed along the circumference of the chip surface. Furthermore, it should be noted that the chip breaking means may include elevations and depressions that are provided in an alternate order along the circumference of the chip surface.

The chip breaking means include a number of elevations that extend outward in respect of the tool axis and form a polygonal shape of the second portion as seen in a section perpendicular to the tool axis, the polygonal shape forming corner areas that extend outward in respect of the tool axis. Such a polygonal shape of the second portion may include a triangular shape, a rectangular or quadratic shape, a pentagonal shape or a polygonal shape having even more corners.

The chip breaking means may include a number of elevations that extend outward in respect of the tool axis, each one of which includes a limiting surface that forms a cutting edge where the limiting surface meets the envelope surface of the second portion. This limiting surface extends outward in respect of the rotationally symmetrical shape of the first portion. The limiting surface may be plane, concave, convex or conical. The limiting surface may be parallel to, or essentially parallel to, the plane. The cutting edge that is formed by the limiting surface and the envelope surface and that will hit the chip contributes efficiently in breaking the chip by a cutting and/or shearing machining of the chip.

The second portion may have a rotationally symmetrical second extension. The chip breaking means may then include at least one of a circumferential notch that extends inward in respect of the tool axis and a circumferential elevation that extends outward in respect of the tool axis. Also such a rotationally symmetrical chip breaking elevation or recess may contribute to an efficient breaking of the chip.

In another embodiment, the invention provides a tool part formed for chip-cutting metal machining of a workpiece that rotates in a direction of rotation at a first speed of rotation around a workpiece axis. The tool part includes at least one turning insert that is formed as an integrated part of the tool part. The turning insert includes a front surface, an envelope surface, and a circular cutting edge located where the front surface meets the envelope surface. The cutting edge extends around the front surface and lays in a plane that forms an angle α with the envelope surface. A tool axis extends through the turning insert in a normal direction in respect of the plane, and the turning insert, during the chip-cutting metal machining, is formed to rotate around the tool axis at a second speed of rotation. The envelope surface forms a chip surface and is arranged to meet chips formed in the chip-cutting metal machining, and the chip surface includes chip breaking means.

The tool part may be formed as a cylindrical, or essentially cylindrical, body having two ends, one or both ends being provided with an integrated turning insert.

In yet another embodiment, the invention provides a method for chip-cutting metal machining by a tool having a turning insert, the turning insert including a front surface, an envelope surface, and a circular cutting edge located where the front surface meets the envelope surface, the cutting edge extending around the front surface and lying in a plane that forms an angle α with the envelope surface, and a tool axis extending through the turning insert in a normal direction in respect of the plane. The method includes rotating a workpiece spindle including a workpiece in a direction of rotation around a workpiece axis at a first speed of rotation, rotating the tool and the turning insert around the tool axis at a second speed of rotation, and bringing the rotating turning insert into engagement with the rotating workpiece and feeding the turning insert in relation to the workpiece. The turning insert is fed in relation to the workpiece in such a way that the envelope surface forms a chip surface and meets chips formed in the chip-cutting metal machining, and the chips are broken by chip breaking means on the chip surface.

The first speed of rotation may be considerably higher than the second speed of rotation. The second speed of rotation, i.e., the speed of rotation of the turning insert around its own tool axis, may be from a few revolutions per minute to, for instance, 3000 r/min. For instance, the second speed of rotation may be about 1000 r/min. It is also possible to vary the second speed of rotation during a working operation or between different working operations.

The direction of rotation of the workpiece in the plane may form an angle with the tool axis, the angle being in the interval of 80-100°.

In still another embodiment, the invention provides a machine tool for chip-cutting metal machining, including a workpiece spindle having a holder member formed to hold a workpiece, a first driving member that is arranged to rotate the workpiece spindle and the workpiece in a direction of rotation around a workpiece axis at a first speed of rotation, and a tool having a turning insert, the turning insert including a front surface, an envelope surface, and a circular cutting edge located where the front surface meets the envelope surface, the cutting edge extending around the front surface and lying in a plane that forms an angle α with the envelope surface, and a tool axis extending through the turning insert in a normal direction in respect of the plane. The machine tool further includes a second driving member that is arranged to rotate the tool and the turning insert around the tool axis at a second speed of rotation, and a feeding device that is arranged to bring the rotating turning insert into engagement with the rotating workpiece and feed the turning insert in relation to the workpiece. The envelope surface forms a chip surface and is arranged to meet chips formed in the chip-cutting metal machining, and the chip surface includes chip breaking means.

The machine tool may include a control appliance arranged to control the second driving member with the purpose of affecting the second speed of rotation. The speed of rotation of the turning insert may advantageously be controlled to achieve different properties of the metal machining. A relatively high speed of rotation of the turning insert gives a higher friction and more heat. In such a way, a liquid state, i.e., local melting of the workpiece, can be achieved upon the proper chip formation. A relatively low speed of rotation can, in combination with the non-rotationally symmetrical shape, contribute to an efficient chip breaking.

BRIEF DESCRIPTION OF THE DRAWINGS

The accompanying drawings, which are incorporated herein and constitute part of this specification, illustrate the presently preferred embodiments of the invention, and together with the general description given above and the detailed description given below, serve to explain features of the invention.

FIG. 1 is a schematic side view of parts of a machine tool according to an embodiment of the invention in a first machine set-up;

FIG. 2 is another schematic side view of the machine tool in FIG. 1;

FIG. 5 is a planar view of a turning insert according to a first embodiment of the invention;

FIG. 6 is a side view of the turning insert in FIG. 5;

FIG. 7 is a sectional view along the line VII-VII in FIG. 5;

FIG. 8 is a sectional view along the line VIII-VIII in FIG. 5;

FIG. 9 is a planar view of a turning insert according to a second embodiment of the invention;

FIG. 10 is a side view of the turning insert in FIG. 9;

FIG. 11 is a sectional view along the line XI-XI in FIG. 9;

FIG. 12 is a sectional along the line XII-XII in FIG. 9;

FIG. 23 is a view of a workpiece and a tool having a tool part and a turning insert according to a sixth embodiment of the invention;

FIG. 24 is a perspective view of the tool part in FIG. 23;

FIG. 25 is a side view of the tool part in FIG. 23; and

FIG. 26 is a longitudinal sectional view through the tool in FIG. 23.

DETAILED DESCRIPTION OF THE PREFERRED EMBODIMENTS

Figure 3:
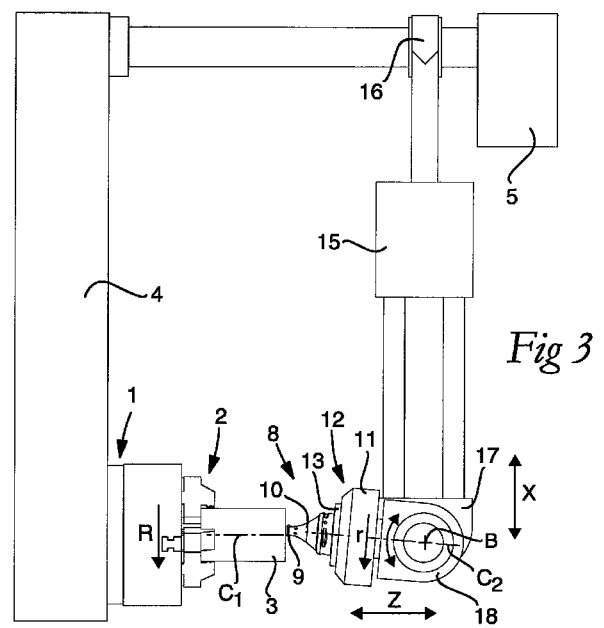
FIG. 3 is a schematic side view of parts of the machine tool in a second machine set-up.

FIGS. 1 and 2 schematically show parts of a machine tool for chip-cutting metal machining in a first machine set-up or variant. The machine tool includes a workpiece spindle 1 having a holder member 2 in the form of a chuck and formed to hold a workpiece 3. The machine tool also includes a first driving member 4 that is arranged to rotate the workpiece spindle 1 and the workpiece 3 in a direction of rotation R around a workpiece axis C1 at a first speed of rotation. The direction of rotation R is clockwise as seen from the first driving member 4. Furthermore, the machine tool includes a control appliance 5 that includes suitable feeding in and feeding out members (not shown) and suitable software for the machine control. The control appliance 5 controls the first driving member 4.

Furthermore, the machine tool includes a tool 8 having a turning insert 9 and a tool holder 10. The tool holder 10 may be manufactured from steel while the turning insert 9 normally is manufactured from a harder material, for instance cemented carbide. In the embodiments shown, the turning insert 9 is accordingly formed as a cutting insert that is removably connected with the tool holder 10. FIGS. 16-19 and 20 show different examples of embodiment of the tool 8 having a tool holder 10 and a turning insert 9.

The machine tool also includes a second driving member 11 that is controlled by the control appliance 5 and drives a tool spindle 12 having a front spindle part 13 in which the tool 8 is detachably mounted. In that connection, a suitable coupling is provided for this mounting. As is seen in FIGS. 16-19, such a coupling may include, for instance, a somewhat conical fastening pin 14 of the tool 8 and a corresponding opening of the spindle part 13. The fastening pin 14 is, in a known way per se, inserted into the opening of the spindle part 13 when the tool is mounted in the spindle part 13. Accordingly, the second driving member 11 drives the tool 8 and the turning insert 9 around a tool axis C2 at a second speed of rotation. The tool 8 is rotatable around an axis B that is perpendicular to the tool axis C2 and intersects the tool axis C2.

The machine tool includes a feeding device that is controlled by the control appliance 5. The feeding device brings the rotating turning insert 9 into engagement with the rotating workpiece 3 and feeds the turning insert 9 in relation to the workpiece 3 in the orthogonal directions Z, Y and X. The direction Z is parallel to the workpiece axis C1. The direction Y is perpendicular to the workpiece axis C1. The direction X is perpendicular to the direction Y and the workpiece axis C1. The feeding device includes an X-driving 15, a Z-driving 16, a Y-driving 17 and a B-driving 18, which are controlled by the control appliance 5. The Z-driving 16 feeds the tool 8 and the turning insert 9 in the direction Z. The Y-driving 17 feeds the tool 8 and the turning insert 9 in the direction Y. The X-driving 15 feeds the tool 8 and the turning insert 9 in the direction X. The B-driving 18 rotates the tool 8 and the turning insert 9 around the axis B.

The design of the turning insert 9 will be explained in more detail, reference being made to the different embodiments shown in FIGS. 5-21. Common to the turning insert 9 in the different embodiments is that the turning insert 9 has a front surface 21, an envelope surface 22 and a circular cutting edge 23 located where the front surface 21 meets the envelope surface 22. Accordingly, the cutting edge 23 extends around the front surface 21 and is lying in a plane P that forms an angle α with the envelope surface 22. In all the embodiments shown, the front surface 21 is plane and coincides with the plane P. However, it should be noted that the front surface 21 may have other shapes, for instance a concave or convex shape.

The envelope surface 22 forms a chip surface 24 and is accordingly arranged to meet the chips that are formed in the chip-cutting metal machining. The chip surface 24 includes means formed to break the chips. The chip surface 24 includes a circumferential first portion 24a that borders on the cutting edge 23 and a circumferential second portion 24b that borders on the circumferential first portion 24a.

In FIGS. 1 and 2, the machine tool is arranged in a first machine set-up, in which the rotationally symmetrical circumference surface of the workpiece 3 is machined by turning. In the case shown, this surface is cylindrical but it may also be conical or concavely or convexly decreasing along the workpiece axis C1. The turning insert 9 rotates in a direction of rotation r that is counter-clockwise as seen from the second driving member 11. The point on the cutting edge 23 of the turning insert 9 that is in engagement with the workpiece 3 is in or beside the center plane of the workpiece 3, see FIG. 2, which is parallel to the tool axis C2. The direction of rotation R of the workpiece 3 in the plane P forms an angle with the tool axis C2. This angle is in the interval of 80-100°. It should be noted that it is possible to allow the direction of rotation r of the turning insert 9 to be clockwise as seen from the second driving member 11 with preserved direction of rotation R.

Figure 4:
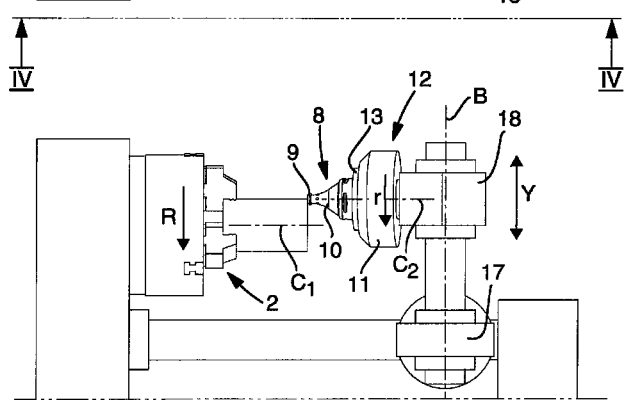
FIG. 4 is a schematic view along the line IV-IV in FIG. 3.

In FIGS. 3 and 4, the machine tool is shown arranged in a second machine set-up, in which the end surface of the workpiece 3 is machined. In the example shown, face turning of the end surface is shown. It should be noted that the end surface may have a shape that deviates from an entirely plane shape, for instance a concave or convex shape. The direction of rotation R of the workpiece 3 is clockwise as seen from the first driving member 4. In the example shown, the direction of rotation R of the turning insert 9 is counter-clockwise as seen from the second driving member 11. In the shown machine tool, the workpiece axis C1 and the tool axis C2 form an angle that is approx. +1 to +10°, preferably approx. +5°, or approx. −1 to −10°, preferably approx. −5°.

FIGS. 5-8 show a first embodiment of the turning insert 9. The turning insert 9 is formed as a cutting insert having a fastening hole 25 for the receipt of a fastening element, for instance a screw 38, see FIG. 20, for fastening the turning insert 9 in the tool holder 10. The fastening hole 25 extends through the front surface 21 and the turning insert 9.

The first portion 24a of the chip surface 24 has a rotationally symmetrical first extension and, in the first embodiment, a concave shape as seen in a cross-sectional plane comprising the tool axis C2, see FIGS. 7 and 8. In the first embodiment, the angle α is measured in the immediate vicinity of the cutting edge 23 and less than 90° in respect of the first portion 24a. The angle α may be 40-80°.

The chip breaking means include the circumferential second portion 24b of the chip surface 24. In that connection, in the first embodiment, the second portion 24b has a non-rotationally symmetrical second extension that forms at least part of the chip breaking means. The chip breaking means may include at least one elevation 26 that extends outward in respect of the tool axis C2, and/or a recess that extends inward in respect of the tool axis C2. In the first embodiment, such a shape is realized by the chip breaking means including four elevations 26 that extend outward in respect of the tool axis C2 and form a polygonal shape of the second portion 24b as seen in a section perpendicular to the tool axis C2. The polygonal shape includes or forms corner areas, or wings, that extend outward in respect of the tool axis C2. In the first embodiment, the polygonal shape is quadratic or essentially quadratic.

The shown elevations 26, which extend outward in respect of the tool axis C2, include each a limiting surface 27 that forms an edge or a cutting edge 28 where the limiting surface 27 meets the envelope surface 22 of the second portion 24b.

FIGS. 9-12 show a second embodiment of the turning insert 9. The turning insert 9 in the second embodiment differs from the turning insert in the first embodiment only in that the first portion 24a is conical, see FIGS. 10-12. Accordingly, the angle α is less than 90° in respect of the first portion 24a. It should be noted here that the first portion could be cylindrical, i.e., that the angle α is equal to, or essentially equal to, 90° in respect of the first portion 24a.

Figure 13:
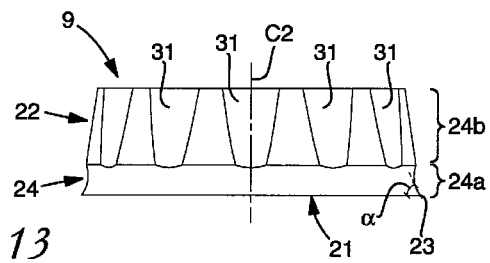
FIG. 13 is a side view of a turning insert according to a third embodiment of the invention.
Figure 14:
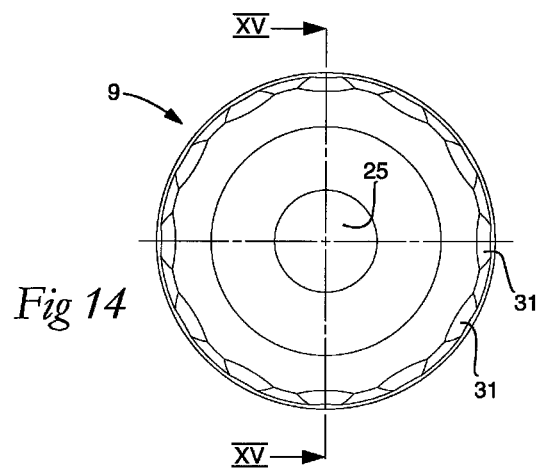
FIG. 14 is a planar view of the turning insert in FIG. 13.
Figure 15:
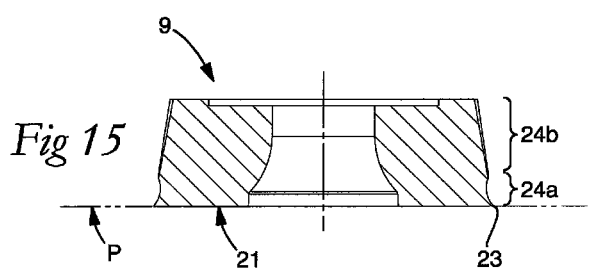
FIG. 15 is a sectional view along the line XV-XV in FIG. 14.
Figure 16:
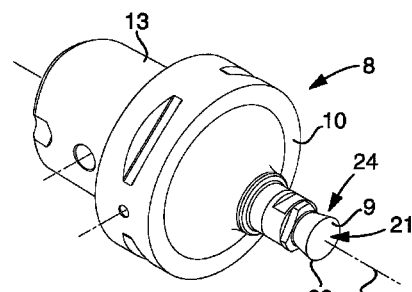
FIG. 16 is a perspective view of a tool having a turning insert according to a fourth embodiment of the invention.
Figure 17:
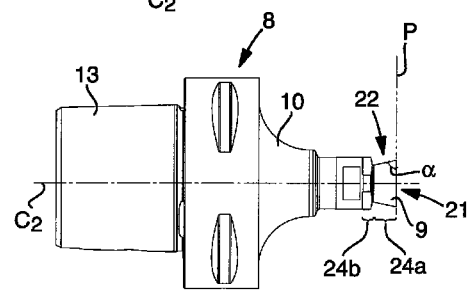
FIG. 17 is a side view of the tool in FIG. 16.
Figure 18:
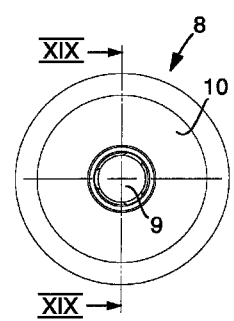
FIG. 18 is a front view of the tool in FIG. 16.

FIGS. 13-15 show a third embodiment of the turning insert 9. The turning insert 9 in this embodiment differs from the turning insert according to the first embodiment in that the chip breaking means include a plurality of recesses 31 that extend inward in respect of the tool axis C2. In the third embodiment, these recesses are realized as facets, or chamfered portions, in the envelope surface 22 of the second portion 24b. These facets may be plane or concave. In the third embodiment, 12 such recesses 31 are shown. It should be noted that the number of recesses 31 may be varied and be, for instance 3, 4, 5, 6 or more, or even more than 12 at least partly depending on the diameter of the turning insert 9.

FIGS. 16-19 show a fourth embodiment that differs from the second embodiment in that the chip breaking means include three elevations 26 that form a polygonal shape, i.e., a triangular shape as seen in a section perpendicular to the tool axis C2. The first portion 24a is conical but could naturally also be cylindrical or have a concave shape as seen in a cross-sectional plane comprising the tool axis C2.

Figure 19:
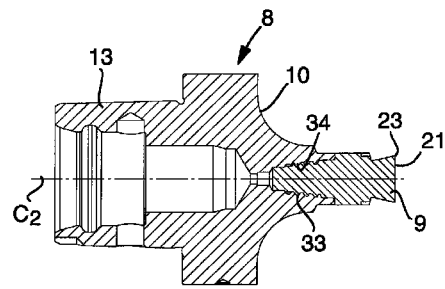
FIG. 19 is a sectional view along the line XIX-XIX in FIG. 18.

The fourth embodiment also differs from the earlier embodiments in that the turning insert 9 has a tapering fastening pin 33 formed to be inserted and be fastened in a corresponding opening 34 of the tool holder 10. As is seen in FIG. 19, the fastening pin 33 and the opening 34 has each a thread, which are in engagement with each other when the turning insert 9 is fixed in the tool holder 10.

Figure 20:
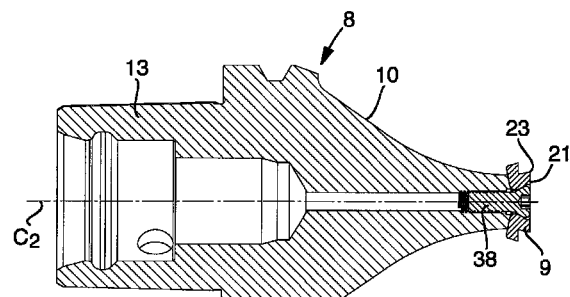
FIG. 20 is a longitudinal sectional view of a tool having a turning insert according to the first embodiment shown in FIGS. 5-8.

FIG. 20 shows a tool 8 having a tool holder 10 and a turning insert 9 according to the first embodiment. The turning insert 9 is detachably mounted on the tool holder 10 by a fixing screw 38.

Figure 21:
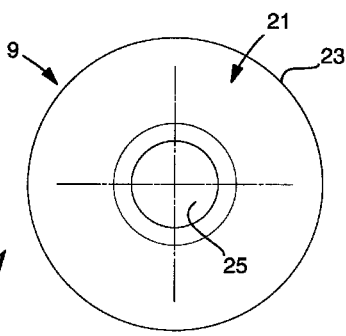
FIG. 21 is a planar view of a turning insert according to a fifth embodiment of the invention.
Figure 22:
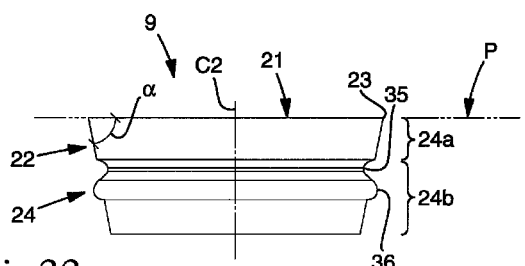
FIG. 22 is a side view of the turning insert in FIG. 21.

FIGS. 21 and 22 illustrate a fifth embodiment of a turning insert 9, wherein the chip breaking means include a circumferential notch 35 that extends inward in respect of the tool axis C2, and a circumferential elevation 36 that extends outward in respect of the tool axis C2. Such a rotationally symmetrical shape of the chip breaking means may advantageously be provided on the second portion 24b, i.e., at a certain distance from the cutting edge 23. It should be noted that the chip breaking means in the fifth embodiment do not necessarily need to comprise both the circumferential notch 35 and the circumferential elevation 36. The chip breaking means may be formed of the circumferential notch 35 or of the circumferential elevation 36.

FIGS. 23-26 show a turning insert 9 according to a sixth embodiment, which is an integrated part of a tool part 8' that is mounted in the tool 8. The turning insert 9 is formed in the tool part 8', for instance by machining of the tool part 8' for the creation of the cutting edge 23 and other details. The tool part 8' is formed as a cylindrical body having two ends. One or both ends may be provided with a respective integrated turning insert 9. In the embodiment illustrated, the tool part 8' is formed as a solid, or essentially solid, body. The tool part 8' may, however, include one or more cooling ducts (not shown) that extend through the solid body.

In the sixth embodiment, the tool 8 has a tool holder 10 that is formed as a chuck-like holder or as a tool chuck. The tool holder 10 includes a cylindrical, or essentially cylindrical, cavity for the receipt of the tool part 8' including the turning insert(s) 9 in such a way that one turning insert 9 is outside the cavity. The tool holder 10 in the sixth embodiment may also include one or more clamping jaws (not shown). The clamping jaws may advantageously act radially against the tool part 8' to engage and reliably hold the same in the cavity.

The tool part 8' may be manufactured from solely cemented carbide or primarily of cemented carbide using a material that is harder than cemented carbide at one or both ends. This material may be applied as a layer or soldered flake to the proper turning insert 9 and may include a number of different types of materials, for instance of ceramics, cubic boron nitride CBN, polycrystalline diamond PCD, etc.

The part of the tool part 8' that forms the turning insert 9 may be formed as the turning insert 9 of the other embodiments and accordingly include a front surface 21, an envelope surface 22 and a circular cutting edge 23 located where the front surface 21 meets the envelope surface 22. The cutting edge 23 extends around the front surface 21 and is lying in the plane P that forms the angle $\alpha$ (not explicitly shown in FIGS. 23-25) with the envelope surface 22. Accordingly, the envelope surface 22 forms the chip surface and is arranged to meet chips formed in the chip-cutting metal machining. The chip surface includes a circumferential first portion 24a that borders on the cutting edge 23 and a circumferential second portion 24b that borders on the first portion 24a. The chip breaking means include the second portion 24b. The first portion 24a has a rotationally symmetrical first extension. In the embodiment illustrated, the angle $\alpha$ is less than 90° in respect of the first portion 24a. The first portion 24a is conical or has a concave shape as seen in a cross-sectional plane including the tool axis C2. The second portion 24b has a non-rotationally symmetrical second extension that forms the chip breaking means.

According to the sixth embodiment, the chip breaking means include a plurality of recesses 31 that, like the third embodiment shown in FIGS. 13-15, extend inward in respect of the tool axis C2 and may be realized as plane or concave facets, or chamfered portions, in the envelope surface 22 of the second portion 24b.

It should also be noted that the concave shape of the first portion 24a, in the first and third embodiments, may form at least part of the chip breaking means. Such a chip breaking function, i.e., so that the chips indeed are broken in pieces, can be achieved if the radius of curvature of the concave shape is relatively short. Such a concave shape of the first portion 24a may be combined with chip breaking means of the second portion 24b.

If the radius of curvature is sufficiently short, the concave shape of the first portion 24a may be the only chip breaking means of the turning insert 9, i.e., the second portion 24b includes no chip breaking means. The second portion 24b may then have a rotationally symmetrical second extension.

Accordingly, by the shown machine tool having the shown turning insert, an efficient turning machining can be achieved, the envelope surface of the turning insert forming a chip surface that is formed with means for efficient breaking of the formed chips into chips of short length. By the control appliance 5 and the different drivings, different machining parameters can be affected. For instance, the first and second driving members can be adjusted to desired speeds of rotation to achieve different properties of the metal machining.

Advantageously, the first and second driving members 4 and 11 are controlled so that the first speed of rotation of the workpiece 3 is considerably higher than the second speed of rotation of the turning insert 9. The speed of rotation of the turning insert 9 around its own tool axis may be from a few revolutions per minute to about 3000 r/min, for instance about 200, 500, 1000, 1500, 2000 or 2500 r/min. It is also possible to vary the second speed of rotation during a working operation or between different working operations. Furthermore, the turning insert 9 may be given a relatively high speed of rotation, particularly in relation to the workpiece 3, which gives a higher friction and more heat, and possibly local melting of the workpiece upon the chip formation. The turning insert 9 may also be given a relatively low speed of rotation that, in combination with the non-rotationally symmetrical shape, may contribute to an efficient chip breaking.

While the invention has been disclosed with reference to certain preferred embodiments, numerous modifications, alterations, and changes to the described embodiments are possible without departing from the sphere and scope of the invention, as defined in the appended claims and their equivalents thereof. For example, it should be noted that the turning insert 9, except from cemented carbide, may be manufactured from a number of different types of materials, for instance of ceramics, cubic boron nitride CBN, polycrystalline diamond PCD, etc. The turning insert 9 may possibly also be provided with different coverings. Also, the shown tool 8 including the turning insert 9 can usually be used at cutting depths in the interval of 0.01-2.0 mm, suitably 0.05-0.8 mm. The maximum cutting depth could also be related to the diameter of the turning insert 9. The maximum cutting depth of a turning insert 9 having a diameter of 20 mm would then be 2 mm, i.e., a ratio of 10:1. In typical cases, the turning insert 9 can have a diameter that is in the interval of 6-32 mm. Accordingly, it is intended that the invention not be limited to the described embodiments, but that it have the full scope defined by the language of the following claims.

What is claimed is:

1. A turning insert formed for chip-cutting metal machining of a workpiece that rotates in a direction of rotation at a first speed of rotation around a workpiece axis, the turning insert comprising:
   a front surface;
   an envelope surface; and
   a circular cutting edge located where the front surface meets the envelope surface, the cutting edge extending around the front surface and lying in a plane that forms an acute angle $\alpha$ with the envelope surface, a tool axis extending through the turning insert in a normal direction in respect of the plane, and the turning insert, during the chip-cutting metal machining, being formed to rotate around the tool axis at a second speed of rotation,
   wherein the envelope surface forms a chip surface and is arranged to meet chips formed in the chip-cutting metal machining, and the chip surface comprises chip breaking means,
   wherein the chip surface comprises a circumferential first portion that borders on the cutting edge and a circumferential second portion that borders on the circumferential first portion,
   wherein the circumferential first portion has one of a concave shape and a conical shape as seen in a cross-sectional plane including the tool axis, and
   wherein at least a portion of the envelope surface of the circumferential second portion projects radially outward past at least a portion of the envelope surface of the circumferential first portion.

2. The turning insert according to claim 1, wherein the chip breaking means include the circumferential second portion.

3. The turning insert according to claim 1, wherein the first circumferential portion has a rotationally symmetrical first extension.

4. The turning insert according to claim 1, wherein the first portion has both a concave shape and a conical shape as seen in the cross-sectional plane including the tool axis and.

5. The turning insert according to claim 1, wherein the concave shape forms at least part of the chip breaking means.

6. The turning insert according to claim 1, wherein the circumferential second portion has a non-rotationally symmetrical second extension that forms at least part of the chip breaking means.

7. The turning insert according to claim 1, wherein the chip breaking means comprise at least one of an elevation that extends outward in respect of the tool axis and a recess that extends inward in respect of the tool axis.

8. The turning insert according to claim 7, wherein the chip breaking means comprise a number of elevations that extend outward in respect of the tool axis and form a polygonal shape of the circumferential second portion as seen in a section perpendicular to the tool axis, and wherein the polygonal shape forms corner areas that extend outward in respect of the tool axis.

9. The turning insert according to claim 7, wherein the chip breaking means comprise a number of elevations that extend outward in respect of the tool axis, each one of which includes a limiting surface that forms a cutting edge where the limiting surface meets the envelope surface of the circumferential second portion.

10. The turning insert according to claim 1, wherein the circumferential second portion has a rotationally symmetrical second extension.

11. The turning insert according to claim 10, wherein the chip breaking means comprise at least one of a circumferential notch that extends inward in respect of the tool axis and a circumferential elevation that extends outward in respect of the tool axis.

12. A tool part formed for chip-cutting metal machining of a workpiece that rotates in a direction of rotation at a first speed of rotation around a workpiece axis, the tool part comprising:
at least one turning insert that is formed as an integrated part of the tool part, the turning insert comprising a front surface;
an envelope surface; and
a circular cutting edge located where the front surface meets the envelope surface, the cutting edge extending around the front surface and lying in a plane that forms an acute angle α with the envelope surface, a tool axis extending through the turning insert in a normal direction in respect of the plane, and the turning insert, during the chip-cutting metal machining, being formed to rotate around the tool axis at a second speed of rotation,
wherein the envelope surface forms a chip surface and is arranged to meet chips formed in the chip-cutting metal machining, and the chip surface comprises chip breaking means,
wherein the chip surface comprises a circumferential first portion that borders on the cutting edge and a circumferential second portion that borders on the circumferential first portion,
wherein the circumferential first portion has one of a concave shape and a conical shape as seen in a cross-sectional plane including the tool axis, and
wherein at least a portion of the envelope surface of the circumferential second portion projects radially outward past at least a portion of the envelope surface of the circumferential first portion.

13. The tool part according to claim 12, wherein the tool part is formed as a cylindrical body having two ends, and wherein at least one of the two ends includes the at least one integrated turning insert.

14. The tool part according to claim 13, wherein a second of the two ends includes another of the at least one integrated turning insert.

15. A machine tool for chip-cutting metal machining, comprising:
a workpiece spindle having a holder member formed to hold a workpiece;
a first driving member that is arranged to rotate the workpiece spindle and the workpiece in a direction of rotation around a workpiece axis at a first speed of rotation;
a tool having a turning insert, the turning insert including a front surface, an envelope surface, and
a circular cutting edge located where the front surface meets the envelope surface, the cutting edge extending around the front surface and lying in a plane that forms an acute angle α with the envelope surface, a tool axis extending through the turning insert in a normal direction in respect of the plane;
a second driving member that is arranged to rotate the tool and the turning insert around the tool axis at a second speed of rotation; and
a feeding device that is arranged to bring the rotating turning insert into engagement with the rotating workpiece and feed the turning insert in relation to the workpiece,
wherein the envelope surface forms a chip surface and is arranged to meet chips formed in the chip-cutting metal machining, and the chip surface comprises chip breaking means,
wherein the chip surface comprises a circumferential first portion that borders on the cutting edge and a circumferential second portion that borders on the circumferential first portion,
wherein the first portion has one of a concave shape and a conical shape as seen in a cross-sectional plane including the tool axis, and
wherein at least a portion of the envelope surface of the circumferential second portion projects radially outward past at least a portion of the envelope surface of the circumferential first portion.

* * * * *